(12) United States Patent
Chuttani et al.

(10) Patent No.: US 9,584,995 B2
(45) Date of Patent: Feb. 28, 2017

(54) EMERGENCY CALLING FOR MULTI-SIM DEVICES

(71) Applicant: Apple Inc., Cupertino, CA (US)

(72) Inventors: Harshit Chuttani, Newark, CA (US); Li Su, San Jose, CA (US); Madhusudan Chaudhary, Campbell, CA (US); Sang Ho Baek, Palo Alto, CA (US); Someet K. Lal, Fremont, CA (US); Thanigaivelu Elangovan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/717,470

(22) Filed: May 20, 2015

(65) Prior Publication Data

US 2016/0345149 A1    Nov. 24, 2016

(51) Int. Cl.
| | |
|---|---|
| *H04M 11/04* | (2006.01) |
| *H04W 4/22* | (2009.01) |
| *H04W 60/00* | (2009.01) |
| *H04W 48/18* | (2009.01) |
| *H04W 84/04* | (2009.01) |

(52) U.S. Cl.
CPC ............ *H04W 4/22* (2013.01); *H04W 48/18* (2013.01); *H04W 60/005* (2013.01); *H04W 84/042* (2013.01)

(58) Field of Classification Search
CPC ....... H04W 4/22; H04W 4/025; H04W 4/003; H04W 4/16
USPC .................... 455/404.1, 416, 404.2
See application file for complete search history.

(56) References Cited

U.S. PATENT DOCUMENTS

| | | | |
|---|---|---|---|
| 8,761,716 B2 | 6/2014 | Lee et al. | |
| 2012/0142308 A1* | 6/2012 | Lee ....................... | H04W 4/003 455/404.1 |
| 2012/0264425 A1* | 10/2012 | Krishnamoorthy ... | H04W 48/16 455/434 |
| 2013/0109436 A1* | 5/2013 | Tat ........................ | H04W 88/06 455/558 |
| 2014/0120859 A1* | 5/2014 | Ekici ..................... | H04W 4/22 455/404.1 |
| 2014/0256283 A1 | 9/2014 | Lin et al. | |
| 2015/0056943 A1* | 2/2015 | Huang ................... | H04W 4/22 455/404.1 |

(Continued)

FOREIGN PATENT DOCUMENTS

WO    2014090338    6/2014

*Primary Examiner* — William Nealon
(74) *Attorney, Agent, or Firm* — Meyertons Hood Kivlin Kowert & Goetzel, P.C.; Jeffrey C. Hood; Joel L. Stevens

(57) ABSTRACT

Apparatuses, systems, and methods for multi-SIM user equipment (UE) devices to perform emergency calling. A UE may receive an indication to initiate an emergency call. The UE may select a cell on which to initiate the emergency call. If a serving cell of a first SIM of the UE is not available for the emergency call, the UE may utilize information from a second SIM of the UE as part of selecting the cell on which to initiate the emergency call. The information from the second SIM may include an indication of a serving cell of the second SIM. Alternatively or in addition, the information from the second SIM may include an indication of one or more neighboring cells of the second SIM. The emergency call may be initiated via the selected cell using the first SIM.

17 Claims, 6 Drawing Sheets

(56) References Cited

U.S. PATENT DOCUMENTS

2015/0281929 A1* 10/2015 Shih ..................... H04W 4/22
                                                                    455/404.1

* cited by examiner

EMERGENCY CALLING FOR MULTI-SIM DEVICES

FIELD

The present application relates to wireless devices, including apparatuses, systems, and methods for multi-SIM wireless devices to perform emergency calls.

DESCRIPTION OF THE RELATED ART

Wireless communication systems are rapidly growing in usage. Further, wireless communication technology has evolved from voice-only communications to also include the transmission of data, such as Internet and multimedia content. In certain scenarios a wireless device may include or be capable of utilizing multiple subscriber identity modules (SIMs). Determining how to operate effectively and efficiently with multi-SIM capability may be a challenging problem. Thus, improvements in the field are desired.

SUMMARY

Embodiments are presented herein of apparatuses, systems, and methods for a multi-SIM device to perform emergency calling.

In some embodiments, upon receiving an indication to initiate an emergency call, a UE may select a cell on which to initiate the emergency call. If a primary SIM of the UE is registered with a serving cell and able to make the emergency call via its serving cell, the UE may do so.

However, if the primary SIM of the UE is not able to use its serving cell (e.g., if the UE is not registered with a serving cell), an alternate cell may be selected. If the UE includes a secondary SIM which is registered with a serving cell, it may be possible to utilize its serving cell or information regarding its neighboring cells to quickly find such an alternate cell.

If the UE is not able to find a cell on which to initiate the emergency call using the cell information from the secondary SIM, or if serving and/or neighboring cell information is not available from the secondary SIM, the UE may fall back to performing a more broad frequency channel and/or band scan.

Thus, according to the techniques described herein, a multi-SIM device may be able to leverage information from either or both of its SIMs when selecting a cell on which to initiate an emergency call. This may result in an emergency call being quickly established, at least in some instances, which may be beneficial since emergency calls may typically relate to time-sensitive matters.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
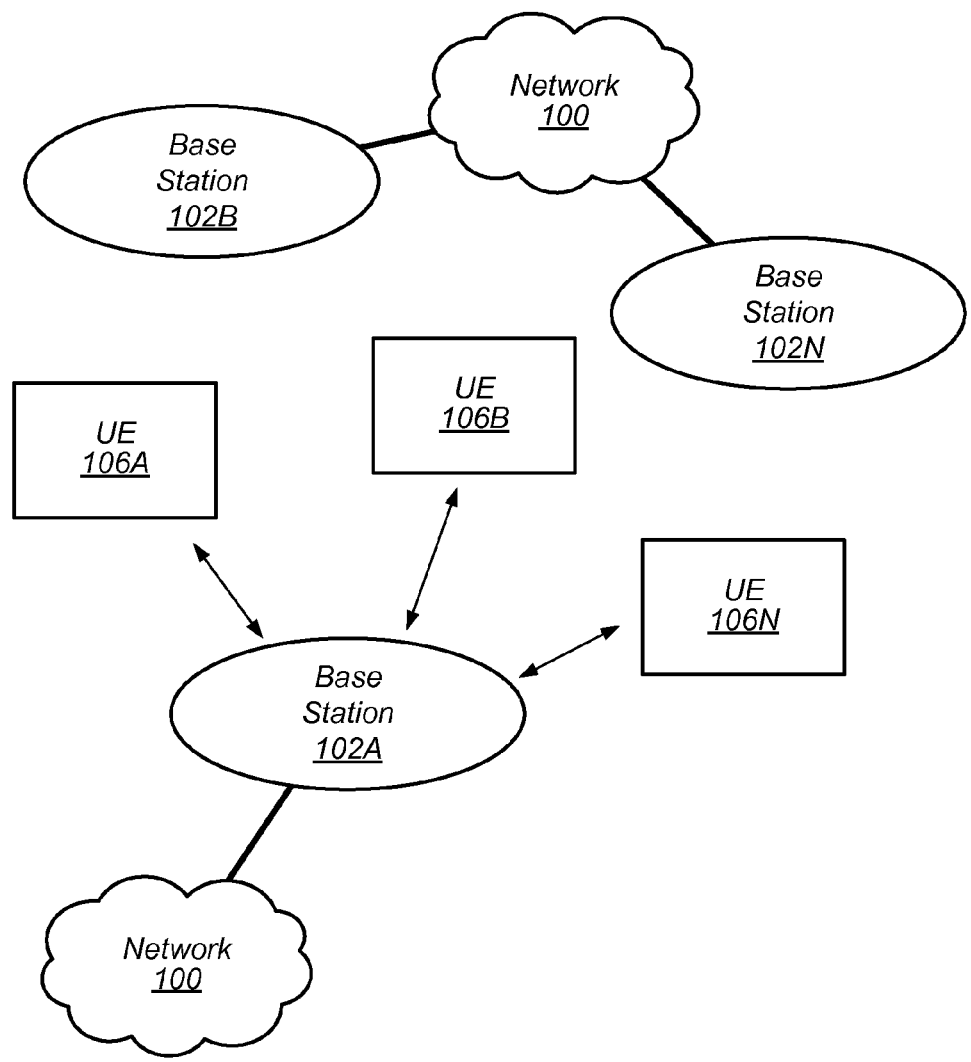
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
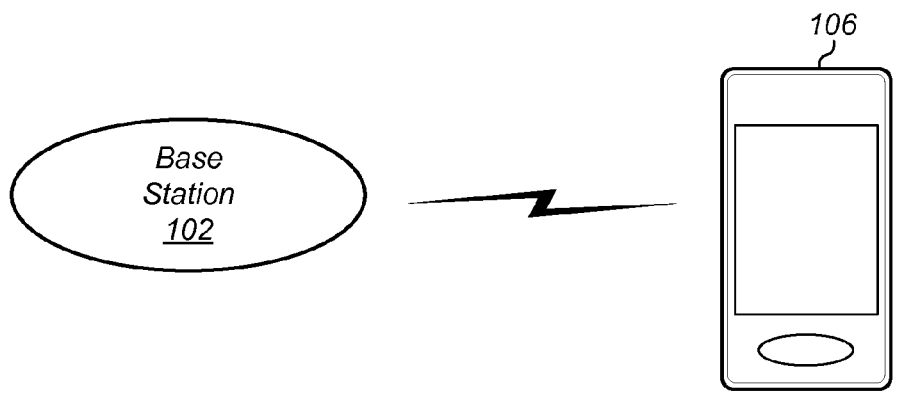
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE and 1×RTT (or LTE and GSM), and separate radios for communicating using each of Wi-Fi and Bluetooth. Other configurations are also possible.

Figure 3:
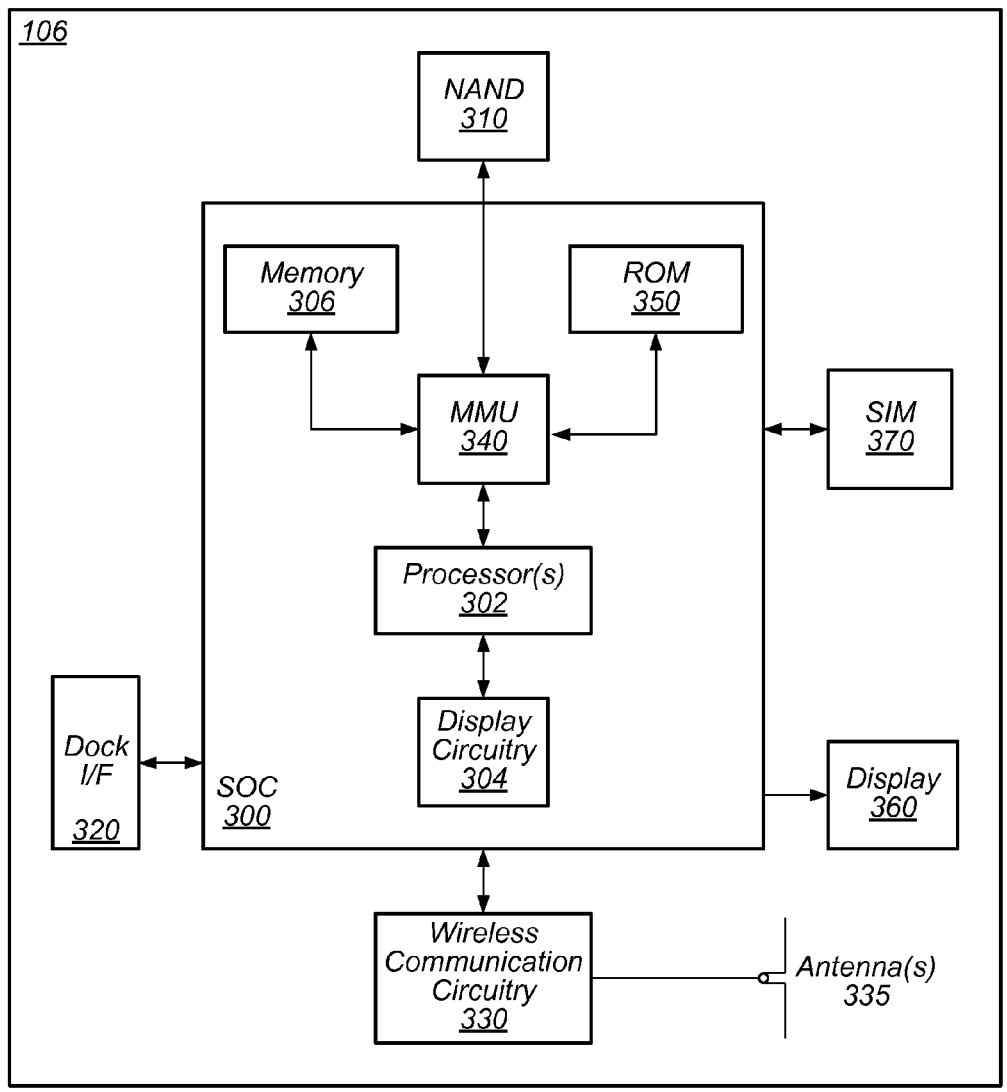
FIG. 3 illustrates an example block diagram of a UE according to some embodiments.

FIG. 3—Block Diagram of a UE

FIG. 3 illustrates an example block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As noted above, the UE 106 may be configured to communicate wirelessly using multiple wireless communication technologies. As further noted above, in such instances, the wireless communication circuitry 330 may include radio components which are shared between multiple wireless communication technologies and/or radio components which are configured exclusively for use according to a single wireless communication technology. As shown, the UE 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As shown, the UE 106 may also include or be coupled to a SIM (Subscriber Identity Module) 370. The SIM 370 may be implemented as an application on a smart card, in some embodiments. The smart card may itself be referred to as a SIM card in some cases. As one example, the SIM 370 may be an application which executes on a Universal Integrated Circuit Card (UICC). The smart card may also include (e.g., store and/or execute) one or more other applications, if desired. The smart card may be removable.

Alternatively, the SIM 370 may be implemented as an embedded SIM (eSIM). In this case, the SIM 370 may be implemented in device hardware and/or software. For example, in some embodiments, the UE 106 may include an embedded UICC (eUICC), e.g., a device which is built into the UE 106 and is not removable. The eUICC may be programmable, such that an eSIM may be implemented on the eUICC. In other embodiments, the eSIM may be installed in UE 106 software, e.g., as program instructions stored on a memory medium (such as memory 306 or NAND 310) executing on a processor (such as processor 302) in the UE 106.

In some embodiments, the UE 106 may be a multi-SIM device, or may at least be multi-SIM capable. Each SIM of such a UE 106 may be implemented in any of various ways, including as a removable SIM or as an embedded SIM, among various possibilities. Dual SIM dual standby (DSDS) and dual SIM dual active (DSDA) are two examples of possible multi-SIM configurations which may be implemented by a UE 106, according to various embodiments.

The subscriber identity information may be used to identify the UE 106 to its subscriber's carrier cellular network. The subscriber identity may also be used outside of the "home" area in which the subscriber's carrier provides cellular service in some situations, for example if the subscriber's carrier has arranged any roaming agreements with other network operators so that the visited network will recognize the subscriber identity information and allow access to the network.

Note that the area in which a subscriber identity may be used to obtain cellular service via the carrier with which the subscriber identity is associated may be considered a "local service area" for the subscriber identity, in which locations the subscriber identity may be considered "local". In other words, as used herein, a UE 106 may be considered able to obtain "local service" in a location using a subscriber identity if the carrier associated with (e.g., which provided) the subscriber identity provides cellular service in that location.

Any areas in which the subscriber identity may be used to obtain cellular service via another carrier than that with which the subscriber identity is associated (e.g., via one or more roaming agreements) may be considered a "roaming service area" for the subscriber identity. In other words, as used herein, a UE 106 may be considered able to obtain "roaming service" in a location using a subscriber identity if carrier with which a roaming agreement has been negotiated by the carrier associated with the subscriber identity provides cellular service in that location.

As described herein, the UE 106 may include hardware and software components for implementing part or all of the methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
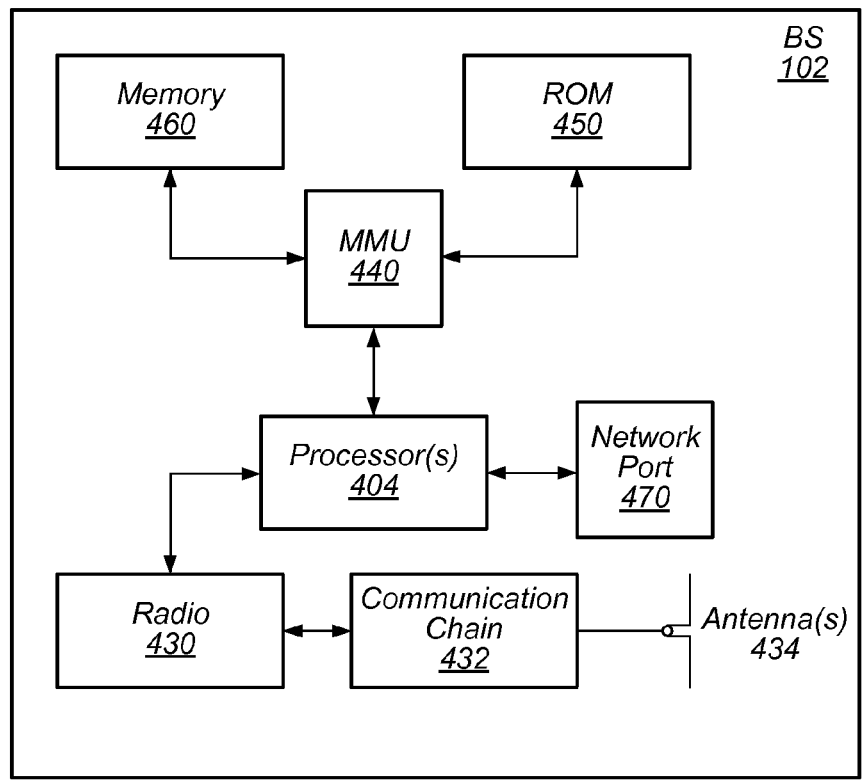
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
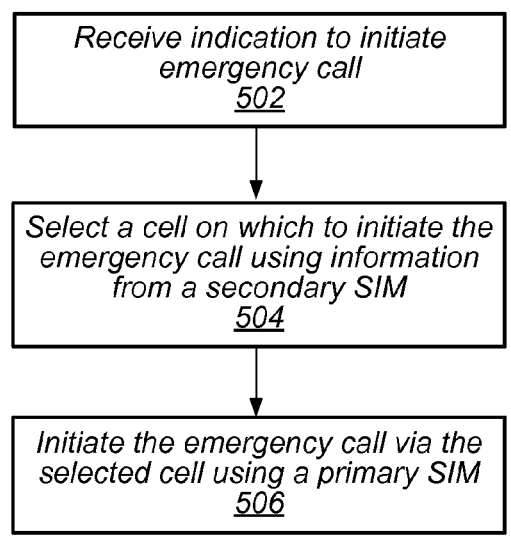
FIGS. 5, 6, and 7A-7B are flowchart diagrams illustrating example methods by which a multi-SIM capable UE may perform emergency calling, according to some embodiments.
Figure 6:
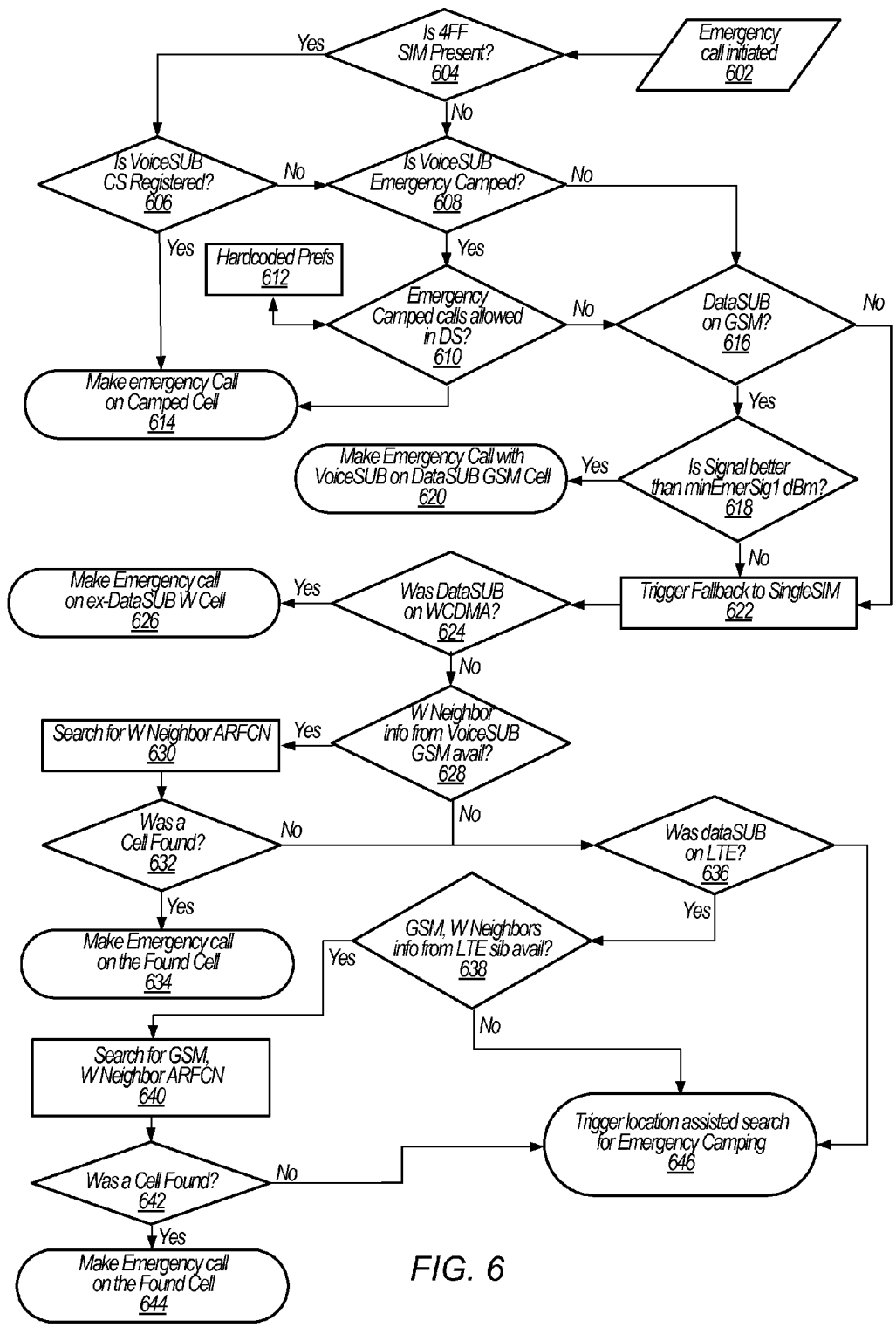

FIGS. 5-7—Flowchart Diagrams

As previously noted, in some scenarios a wireless device may be capable of utilizing multiple subscriber identity modules (SIMs). For example, dual SIM support may enable a device to be simultaneously registered with two SIMs, potentially on two different networks. Dual SIM support may include dual SIM dual standby (DSDS) support, in which a device may be simultaneously registered with two SIMs but may actively communicate with one of the networks at a time (e.g., using a shared radio), or dual SIM dual active (DSDA) support, in which a device may be simultaneously registered with two SIMs and may simultaneously actively communicate two networks at a time, among various dual SIM configurations.

Dual SIM support may be implemented in any of various ways, as desired. For example, a wireless device may provide dual SIM functionality only when the device is in a roaming state, or only when the device is registered with a home network, or both when the device is roaming and when the device is registered with a home network, among various possibilities. As another example, when dual SIM functionality is implemented different SIMs may have different availabilities with respect to voice and data communication. Thus as one possibility, a primary SIM (e.g., corresponding to a first subscription) might be made available for voice communication, while a secondary SIM (e.g., corresponding to a second subscription) might be made available for data communication. Alternate arrangements (e.g., primary SIM available for data, secondary SIM available for voice; both primary and secondary SIMs available for both voice and data; both primary and secondary SIMs available for voice only or for data only, etc.) are also possible. As a still further example, when dual SIM functionality is implemented, different SIMs may have different availabilities with respect to different radio access technologies (RATs); for example, one or more RATs available to one SIM might not be available to the other SIM (and/or vice versa), and/or one or both SIMs might have different RAT availability depending on whether the wireless device is operating in a dual SIM mode or a single SIM mode. As one possible configuration, a SIM might be configured to use any of GSM, WCDMA, and/or LTE for voice and/or data communications when operating in a single SIM mode, and might be configured with the same capabilities or only a subset of those capabilities (e.g., voice only and GSM only, as one possibility) when operating in a dual SIM mode. Numerous other configurations are also possible and should be considered within the scope of this disclosure.

Note also that in some instances, the specific configuration of a dual SIM capable wireless device at a particular time may result from any combination of hardware and/or software features of the wireless device, subscription characteristics of the SIMs used with the wireless device, and/or user preference(s), among various possible considerations and/or constraints.

While it may be possible to operate each SIM entirely independently, in at least some instances, it may be beneficial to share data and/or operations between SIMs under certain circumstances. The optimal manner and circumstances under which to implement such data and/or operation sharing may depend on the configuration of a given wireless device. In many instances, however, it may be the case that such data and/or operation sharing may reduce device power consumption and/or improve user experience, e.g., in comparison to operating each SIM independently of each other SIM of a multi-SIM capable wireless device.

As one possible example of a scenario in which it may be beneficial to share information between SIMs of a wireless device, in at least some instances it may be possible to reduce the call set up time for an emergency call by sharing information between SIMs of a wireless device (e.g., a UE such as UE 106 illustrated in and described with respect to FIGS. 1-3). FIG. 5 is a flowchart diagram illustrating an example method that may be performed by a multi-SIM capable UE to perform emergency calling.

The method shown in FIG. 5 may be used in conjunction with any of the computer systems or devices shown in the above Figures, among other devices. This method may be used in various types of cellular communication systems across any of a variety of cellular technologies. In various embodiments, some of the elements of the scheme shown may be performed concurrently, in a different order than shown, or may be omitted. Additional and/or alternative elements may also be performed as desired. As shown, the method of FIG. 5 may operate as follows.

In 502, an indication to initiate an emergency call may be received by a wireless device. The indication to initiate an emergency call may be received in any of various ways, such as user input to the wireless device dialing an emergency services number, a voice command to the wireless device to initiate an emergency services call, or any of various other possible ways.

In 504, a cell on which to the initiate the emergency call may be selected. The process of selecting the cell on which to initiate the emergency call may be based on information from either or both of a first (e.g., primary) SIM of the wireless device and a second (e.g., secondary) SIM of the wireless device.

Note that, in some instances, the first SIM and the second SIM may provide different services, e.g., at least when in dual SIM mode. For example, it may be the case that when in dual SIM mode the first SIM provides voice services and the second SIM provides data services. As will be readily recognized, other arrangements are also possible. Thus at least in some instances, even if information from the second SIM is used as part of the process for selecting the cell on which to initiate the emergency call, the cell which is selected may be used by the first SIM to actually make the emergency call.

In some instances, if a serving cell of the first SIM is available for the emergency call, the serving cell of the first SIM may be selected for the emergency call. When such an option is available, this may allow for a rapid call set up process, which may be highly beneficial given the generally high priority status of an emergency call.

However, if a serving cell of the first SIM is not available for the emergency call, an alternative cell may be selected for the emergency call. A serving cell of the first SIM might not be available for the emergency call for various possible reasons. As one such possibility, it may be the case that the first SIM is not camped on a cell at all. As another possibility, the first SIM might be "emergency camped" on a cell, but (for any of various possible reasons) emergency camped calls might be disallowed.

Selecting an alternative cell if a serving cell of the first SIM is not available for the emergency call may be based at least in part on information from the second SIM. The information from the second SIM may include serving cell and/or neighboring cell information from the second SIM. For example, if a serving cell of the second SIM is available for the emergency call, the serving cell of the second SIM may be selected for the emergency call.

Determining if the serving cell of the second SIM is available for the emergency call may be based on certain characteristics of the serving cell of the second SIM. One such characteristic may include the signal strength of the serving cell of the second SIM. For example, in some instances, if signal strength of the serving cell of the second SIM is below a certain threshold (e.g., an "emergency calling signal strength threshold"), the serving cell of the second SIM may be considered not usable for the emergency call, while if its signal strength is above the threshold, the serving cell of the second SIM may be considered usable for the emergency call (at least with respect to its signal strength). This may help prevent the occurrence of call failure for the emergency call, which might substantially delay the call setup process. Alternatively, cell signal strength may not be used as a characteristic on the basis of which the availability of a cell for the emergency call is determined, if desired.

As another possible such characteristic, a public land mobile network (PLMN) of the serving cell of the second SIM may be considered in determining the availability of the serving cell of the second SIM for the emergency call. In some regions, it may be the case (e.g., due to regulations, carrier preferences, or for any of various other possible reasons) that emergency calls should preferably be attempted on a home or preferred roaming network if possible. In such a case, it may accordingly be determined if the PLMN of the serving cell of the second SIM is a preferred PLMN (e.g., a PLMN listed in an operator-preferred-PLMN (OPLMN) list) of the first SIM. If the PLMN of the serving cell of the second SIM is not a preferred PLMN of the first SIM, the serving cell of the second SIM may not be considered usable for the emergency call, while if its PLMN of the serving cell of the second SIM is a preferred PLMN of the first SIM, the serving cell of the second SIM may be considered usable for the emergency call (at least with respect to its PLMN). Alternatively, PLMN may not be used as a characteristic on the basis of which the availability of a cell for the emergency call is determined, e.g., if the wireless device is operating in a region where such practice is not specified.

As a still further possible characteristic on the basis of which the availability of the serving cell of the second SIM for the emergency call may be determined, a radio access technology (RAT) according to which the serving cell of the second SIM may be considered. For example, as previously noted, the different SIMs of the wireless device may in some instances have different availabilities with respect to different RATs. If the serving cell of the second SIM operates according to a RAT which is not available to the first SIM, the serving cell of the second SIM may not be considered usable for the emergency call, while if the serving cell of the second SIM operates according to a RAT which is available to the first SIM, the serving cell of the second SIM may be considered usable for the emergency call (at least with respect to its RAT).

As also previously noted, in some instances a RAT may be available for a given SIM of a wireless device while the SIM is in single SIM mode but not while the SIM is in dual- or multi-SIM mode. Accordingly, at least in some instances, if a serving cell of the second SIM operates according to a RAT which is available to the first SIM in single SIM mode but not in dual- or multi-SIM mode, the serving cell of the second SIM may be considered usable for the emergency call (at least with respect to its RAT), but the wireless device may transition from the dual- or multi-SIM mode to the single SIM mode (e.g., with the first SIM as the single SIM) in order to use the (e.g., now ex-) serving cell of the second SIM.

As previously noted, in some instances selecting a cell for the emergency call may also or alternatively be based at least in part on neighboring cell information. This may include neighboring cell information from either or both of the first SIM or the second SIM. As one possible example, in some instances one or more targeted searches for neighboring cells might be performed using neighboring cell information, e.g., if both a serving cell of the first SIM and a serving cell of the second SIM are not available for the emergency call.

The neighboring cell information may include any of various possible types of information. As some examples, the neighboring cell information may include any or all of a RAT, an absolute radio frequency channel number (ARFCN) or enhanced ARFCN (EARFCN, e.g., for LTE cells), signal strength information, a PLMN, and/or any of various other types of information. The search(es) for neighboring cells may be targeted to selected cells among cells for which neighboring cell information is available, and/or may be performed in a selected order, based on the characteristics of those neighboring cells for which information is available. For example, the ARFCNs or EARFCNs of one or more neighboring cells may be searched in a preferred order based on any or all of the RATs according to which those cells operate, the signal strengths of those cells, the PLMNs to which those cells belong, the SIM from which the neighbor information was obtained, etc.

At least in some instances, if a suitable cell (e.g., based on RAT, PLMN, signal strength, and/or any other characteristics which may be used to provide a definition of a suitable cell) is found based on the search(es) for neighboring cells using the neighboring cell information obtained from the first SIM and/or the second SIM, that cell may be selected on which to perform the emergency call. At least in some embodiments, the first suitable cell found based on such a search may be selected, e.g., in order to minimize call setup delays caused by searching for a cell.

If no suitable cell is found based on such a targeted search, the wireless device may perform a broader cell search. Such a cell search may include searching one or more recently used frequency channels, and/or one or more frequency bands on which a cell on which the emergency call may be made might be found. The frequency channels and/or bands searched during such a cell search may (at least in some instances) be selected based at least in part on a location of the wireless device (e.g., the cell search may be a location based cell search); for example, the band(s) selected on which to perform the cell search may include one or more bands on which one or more cell are known to be deployed in a particular location (e.g., country, mobile country code identified with a country, or any other location identifier) in which the wireless device is located. At least in some instances, if a suitable cell is found based on such a cell search, that cell may be selected on which to perform the emergency call.

In 506, the emergency call may be initiated via the selected cell. As previously noted, at least in some instances the emergency call may be initiated using the first SIM. For example, if the first SIM provides voice calling capability while the second SIM provides data capability, the first SIM may be used to perform the (e.g., voice) emergency call. As another possibility, the first SIM may be used to initiate the emergency call on the basis of being a primary SIM of the UE, e.g., even if voice services are also available to the second SIM. As yet another possibility, the emergency call may be initiated using the second SIM, if desired. The emergency call may be initiated using any of various radio access technologies (e.g., GSM, W-CDMA, TD-SCDMA, CDMA2000 1xRTT, LTE (e.g., using VoLTE), LTE-A, etc.), e.g., depending on the RAT according to which the cell selected for the emergency call operates.

Both the method of FIG. 6 and the method of FIG. 7 may be illustrative of emergency calling algorithms that may be used with a UE for which dual SIM functionality is available when in a roaming state. According to this dual SIM functionality, the first SIM, representing a first subscription, is available for voice services using GSM, and the second SIM, representing a second subscription, is available for data services using GSM, W-CDMA, and LTE. Furthermore, in this particular scenario, the first SIM may be available for voice services using GSM or WCDMA when operating in single SIM mode. At least in some instances, the first SIM may also be available for data services using GSM, WCDMA, and/or LTE when operating in single SIM mode. As previously noted, any number of alternate implementations (e.g., in which voice services using LTE also available for the first SIM in single SIM mode, and/or in which WCDMA and/or LTE services (for voice and/or data) are available for the first SIM in dual SIM mode, among various possibilities) are also possible.

Note that FIGS. 6-7 and the information provided herein below in conjunction therewith are provided by way of example of various considerations and details relating to possible systems with which the method of FIG. 5 may be implemented, and are not intended to be limiting to the disclosure as a whole. Numerous variations and alternatives to the details provided herein below are possible and should be considered within the scope of the disclosure.

FIG. 6 is a flowchart diagram illustrating an example method that may be performed by a dual SIM UE to perform emergency calling in a scenario in which an emergency call may be initiated on the first available network (i.e., in which that network does not have to be a home or a preferred roaming network). As shown, the method of FIG. 6 may operate as follows.

In 602, an emergency call may be initiated.

In 604, it may be determined whether a physical/removable SIM card (e.g., a "fourth form factor" or "4FF" SIM card) is present. The 4FF SIM card (if present) may provide the primary SIM, and may provide a voice service subscription, and may thus also be referred to as "voiceSUB".

In 606, if a 4FF SIM card is present, it may be determined whether the voiceSUB is registered for circuit switched (CS) services.

In 608, if a 4FF SIM card is not present, or if a 4FF SIM card is present but the voiceSUB is not CS registered, it may be determined whether the voiceSUB is emergency camped.

In 610, if the voiceSUB is emergency camped, it may be determined whether emergency camped calls are allowed in dual SIM mode. This may depend on certain hardcoded preferences 612 of the device.

In 614, if the voiceSUB is CS registered, or if the voiceSUB is emergency camped and emergency camped calls are allowed, the emergency call may be made on the camped cell.

In 616, if the voiceSUB is not emergency camped or if emergency camped calls are not allowed, it may be determined whether a secondary SIM is camped on a GSM cell. The secondary SIM may be an eSIM, or may alternatively be a removable SIM, and may as previously noted be available for data services. Accordingly, the secondary SIM may be referred to as "dataSUB".

In 618, optionally a signal strength threshold test may be performed on the dataSUB serving cell if the dataSUB is on GSM. For example, as shown, it may be determined whether a signal strength of the dataSUB GSM cell is above a signal strength threshold ("minEmerSig1"), e.g., as measured in dBm.

In 620, if the dataSUB is camped on a GSM cell (and if the cell meets the signal strength requirement, if applied), the emergency call may be made by the voiceSUB using the GSM cell on which the dataSUB is camped.

In 622, if the dataSUB is not camped on a GSM cell (or if the GSM cell of the dataSUB doesn't meet the signal strength requirement, if applied), fallback to single SIM mode (e.g., in which the voiceSUB is the single SIM) may be triggered. Note that fallback to single SIM may occur in this particular example since, as previously noted, in this exemplary case the voiceSUB may be configured to use only GSM when in the dual SIM mode and GSM or WCDMA for voice services in the single SIM mode. Falling back to single SIM mode may thus be performed to provide access to WCDMA cells. It should be recognized that in other implementations (e.g., in which both GSM and WCDMA, and/or any of various other possible RATs, are available to the voiceSUB when in dual SIM mode), fallback to single SIM mode may be performed at a different point or may not be performed at all.

In 624, it may be determined whether the dataSUB was camped on a WCDMA (also referred to as "W" for simplicity with respect to FIG. 6) cell.

In 626, if the dataSUB was camped on a WCDMA cell, the emergency call may be made (e.g., by the voiceSUB) using the WCDMA cell on which the dataSUB was previously camped.

In 628, if the dataSUB was not camped on a WCDMA cell, it may be determined whether WCDMA neighbor info (e.g., from voiceSUB and/or dataSUB GSM camping) is available.

In 630, if WCDMA neighbor info is available, any available neighbor WCDMA cell ARFCNs may be searched.

In 632, it may be determined whether a cell was found as a result of searching for WCDMA neighbors.

In 634, if a cell was found as a result of searching for WCDMA neighbors, the emergency call may be made on the found cell.

In 636, if WCDMA neighbor info is not available, or if no cell was found as a result of searching for WCDMA neighbors, it may be determined whether the dataSUB was camped on a LTE cell.

In 638, if the dataSUB was camped on a LTE cell, it may be determined whether GSM and/or WCDMA neighbor info is available, e.g., from the LTE system information block (SIB). Note that in alternate scenarios (e.g., in which the voiceSUB is able to utilize LTE for the emergency call, such as using voice over LTE (VoLTE)), the voiceSUB might at this point (or at an alternate point) alternatively or additionally search for the EARFCN of the dataSUB's LTE cell and/or one or more LTE neighbors of the dataSUB, and if an LTE cell is found as a result of such searching, the emergency call may be made on the found LTE cell.

In 640, if GSM and/or WCDMA neighbor info is available, any available neighbor GSM and/or WCDMA cell ARFCNs may be searched.

In 642, it may be determined whether a cell was found as a result of searching for GSM and/or WCDMA neighbors.

In 644, if a cell was found as a result of searching for GSM and/or WCDMA neighbors, the emergency call may be made on the found cell.

In 646, if the dataSUB was not camped on LTE, or if GSM and/or WCDMA neighbor info is not available, or if no cell was found as a result of searching for GSM and/or WCDMA neighbors, a location assisted search for emergency camping may be triggered.

Figure 7A:
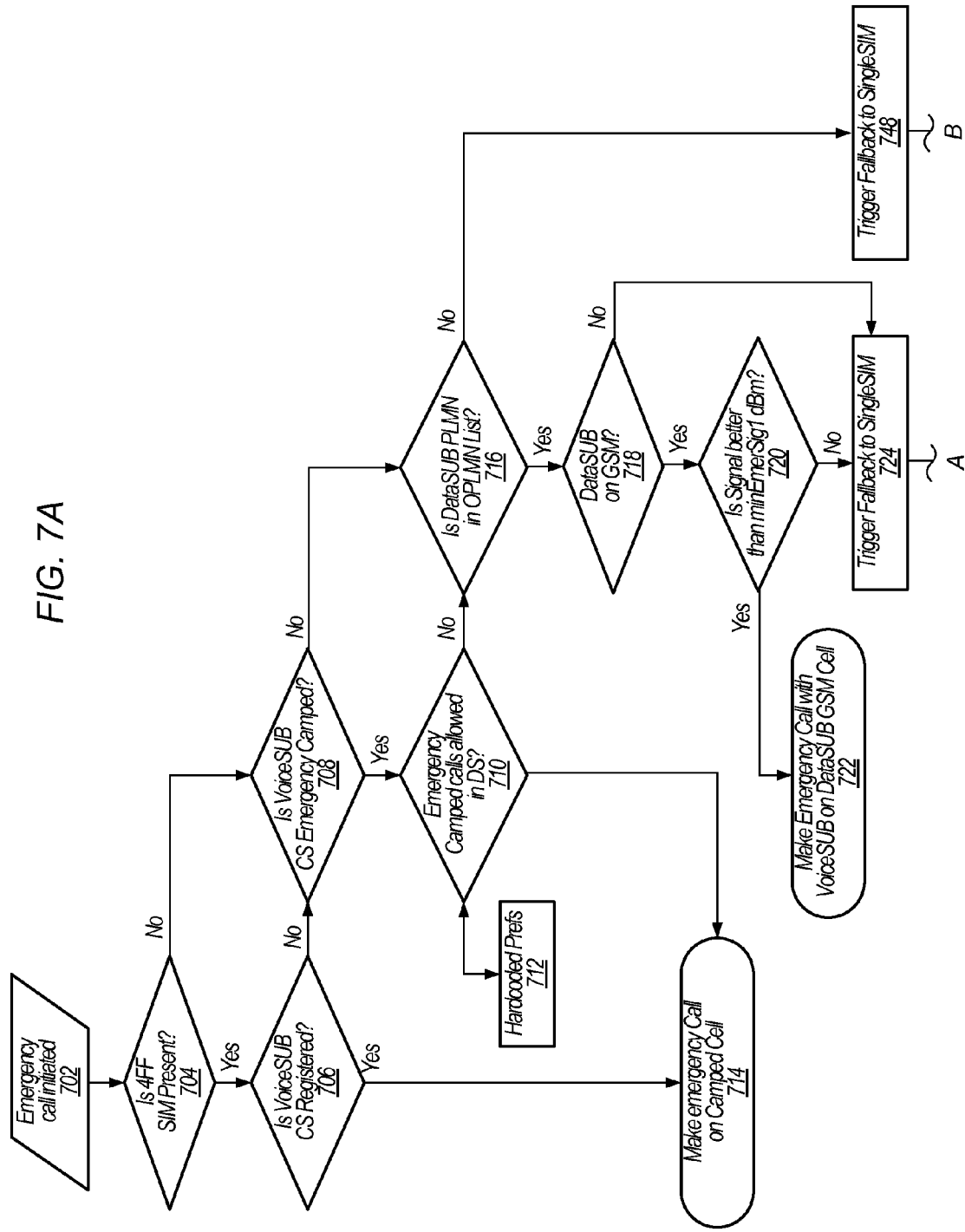
Figure 7B:
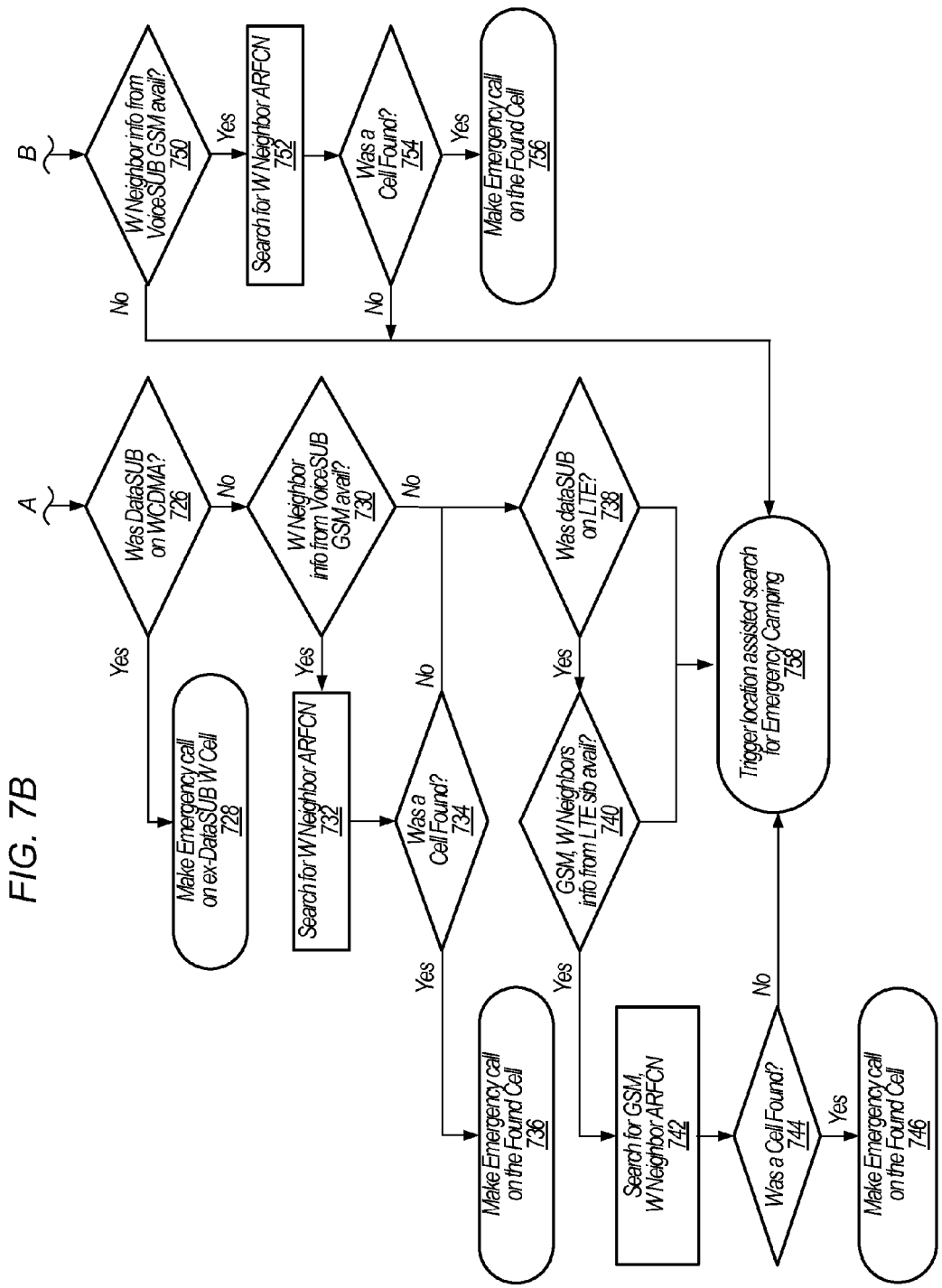

FIGS. 7A-7B are a flowchart diagram illustrating an example method that may be performed by a dual SIM UE to perform emergency calling in a scenario in which an emergency call should preferably be attempted on a home or preferred roaming network, though if there is no cell found in a home or preferred roaming network, any network may be used. As shown, the method of FIGS. 7A-7B may operate as follows.

In 702, an emergency call may be initiated.

In 704, it may be determined whether a physical/removable SIM card (e.g., a "fourth form factor" or "4FF" SIM card) is present. The 4FF SIM card (if present) may provide the primary SIM, and may provide a voice service subscription, and may thus also be referred to as "voiceSUB".

In 706, if a 4FF SIM card is present, it may be determined whether the voiceSUB is registered for circuit switched (CS) services.

In 708, if a 4FF SIM card is not present, or if a 4FF SIM card is present but the voiceSUB is not CS registered, it may be determined whether the voiceSUB is emergency camped.

In 710, if the voiceSUB is emergency camped, it may be determined whether emergency camped calls are allowed in dual SIM mode. This may depend on certain hardcoded preferences 612 of the device.

In 714, if the voiceSUB is CS registered, or if the voiceSUB is emergency camped and emergency camped calls are allowed, the emergency call may be made on the camped cell.

In 716, if the voiceSUB is not emergency camped or if emergency camped calls are not allowed, it may be determined if the PLMN of a secondary SIM is in the OPLMN list of the voiceSUB. The secondary SIM may be an eSIM, or may alternatively be a removable SIM, and may as previously noted be available for data services. Accordingly, the secondary SIM may be referred to as "dataSUB".

In 718, if the dataSUB PLMN is in the voiceSUB OPLMN list, it may be determined whether the dataSUB is camped on a GSM cell.

In 720, optionally a signal strength threshold test may be performed on the dataSUB serving cell if the dataSUB is on GSM. For example, as shown, it may be determined whether a signal strength of the dataSUB GSM cell is above a signal strength threshold ("minEmerSigl"), e.g., as measured in dBm.

In 722, if the dataSUB is camped on a GSM cell (and if the cell meets the signal strength requirement, if applied), the emergency call may be made by the voiceSUB using the GSM cell on which the dataSUB is camped.

In 724, if the dataSUB is not camped on a GSM cell (or if the GSM cell of the dataSUB doesn't meet the signal strength requirement, if applied), fallback to single SIM mode (e.g., in which the voiceSUB is the single SIM) may be triggered. Note that fallback to single SIM may occur in this particular example since, as previously noted, in this exemplary case the voiceSUB may be configured to use only GSM when in the dual SIM mode and GSM or WCDMA for voice services in the single SIM mode. Falling back to single SIM mode may thus be performed to provide access to WCDMA cells. It should be recognized that in other implementations (e.g., in which both GSM and WCDMA, and/or any of various other possible RATs, are available to the voiceSUB when in dual SIM mode), fallback to single SIM mode may be performed at a different point or may not be performed at all.

In 726, it may be determined whether the dataSUB was camped on a WCDMA (also referred to as "W" for simplicity with respect to FIG. 7) cell.

In 728, if the dataSUB was camped on a WCDMA cell, the emergency call may be made (e.g., by the voiceSUB) using the WCDMA cell on which the dataSUB was previously camped.

In 730, if the dataSUB was not camped on a WCDMA cell, it may be determined whether WCDMA neighbor info (e.g., from voiceSUB and/or dataSUB GSM camping) is available.

In 732, if WCDMA neighbor info is available, any available neighbor WCDMA cell ARFCNs may be searched.

In 734, it may be determined whether a cell was found as a result of searching for WCDMA neighbors.

In 736, if a cell was found as a result of searching for WCDMA neighbors, the emergency call may be made on the found cell.

In 738, if WCDMA neighbor info is not available, or if no cell was found as a result of searching for WCDMA neighbors, it may be determined whether the dataSUB was camped on a LTE cell.

In 740, if the dataSUB was camped on a LTE cell, it may be determined whether GSM and/or WCDMA neighbor info is available, e.g., from the LTE system information block (SIB). Note that in alternate scenarios (e.g., in which the voiceSUB is able to utilize LTE for the emergency call, such as using voice over LTE (VoLTE)), the voiceSUB might at this point (or at an alternate point) alternatively or additionally search for the EARFCN of the dataSUB's LTE cell and/or one or more LTE neighbors of the dataSUB, and if an LTE cell is found as a result of such searching, the emergency call may be made on the found LTE cell.

In 742, if GSM and/or WCDMA neighbor info is available, any available neighbor GSM and/or WCDMA cell ARFCNs may be searched.

In 744, it may be determined whether a cell was found as a result of searching for GSM and/or WCDMA neighbors.

In 746, if a cell was found as a result of searching for GSM and/or WCDMA neighbors, the emergency call may be made on the found cell.

In 748, if the PLMN of a secondary SIM is not in the OPLMN list of the voiceSUB, fallback to single SIM mode (e.g., in which the voiceSUB is the single SIM) may be triggered.

In 750, it may be determined whether WCDMA neighbor info (e.g., from voiceSUB GSM camping) is available.

In 752, if WCDMA neighbor info is available, any available neighbor WCDMA cell ARFCNs may be searched.

In 754, it may be determined whether a cell was found as a result of searching for WCDMA neighbors.

In 756, if a cell was found as a result of searching for WCDMA neighbors, the emergency call may be made on the found cell.

In 758, if the dataSUB was not camped on LTE, or if GSM and/or WCDMA neighbor info is not available, or if no cell was found as a result of searching for GSM and/or WCDMA neighbors, a location assisted search for emergency camping may be triggered. Likewise, if WCDMA neighbor info is not available and the PLMN of the dataSUB is not in the OPLMN list of the voiceSUB, or if no cell was found as a result of searching for WCDMA neighbors and the PLMN of the dataSUB is not in the OPLMN list of the voiceSUB, a location assisted search for emergency camping may be triggered.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for a dual subscriber identity module (SIM) device to perform emergency calling, the method comprising:
by a wireless user equipment (UE) device:
receiving an indication to initiate an emergency call;
selecting a cell on which to initiate the emergency call,
wherein the UE comprises at least a first subscriber identity module (SIM) and a second SIM,
wherein selecting the cell on which to initiate the emergency call is based at least in part on information from the second SIM if a serving cell of the first SIM is not available for the emergency call, wherein the information from the second SIM comprises an indication of a serving cell of the second SIM and one or more neighboring cells of the second SIM, and
initiating the emergency call via the selected cell using the first SIM.

2. The method of claim 1,
wherein the first SIM is configured for voice communication,
wherein the second SIM is configured for data communication.

3. The method of claim 1,
wherein selecting the cell on which to initiate the emergency call is also based at least in part on whether a public land mobile network (PLMN) of the second SIM is in a preferred PLMN list of the first SIM if a serving cell of the first SIM is not available for the emergency call.

4. The method of claim 1,
wherein the information from the second SIM comprises radio access technology (RAT), signal strength, and absolute radio frequency channel number (ARFCN) information for each of one or more cells.

5. The method of claim 1, the method further comprising:
selecting a serving cell of the second SIM on which to initiate the emergency call if a signal strength of the serving cell of the second SIM is above an emergency calling signal strength threshold and if a serving cell of the first SIM is not available for the emergency call.

6. The method of claim 1,
wherein selecting the cell on which to initiate the emergency call further comprises performing a targeted search for one or more cells based on neighbor cell information from the second SIM.

7. The method of claim 1, the method further comprising:
performing a location based cell search if a cell on which to initiate the emergency call is not found based on the information from the second SIM.

8. A wireless user equipment (UE) device, comprising:
a radio; and
a processing element operably coupled to the radio;
wherein the radio and the processing element are configured for dual subscriber identity module (SIM) operation, wherein the radio and the processing element are configured to:
receive an indication to initiate an emergency call;
select a cell on which to initiate the emergency call;
wherein if a primary SIM of the UE is registered with a serving cell, the serving cell of the primary SIM is selected as the cell on which to initiate the emergency call;
wherein if the primary SIM of the UE is not registered with a serving cell, the cell on which to initiate the emergency call is selected based at least in part on information from a secondary SIM, wherein to select the cell on which to initiate the emergency call if the primary SIM of the UE is not registered with a serving cell, the radio and the processing element are configured to determine if a serving cell of the secondary SIM has a signal strength above an emergency call signal strength threshold; and
initiate the emergency call via the selected cell.

9. The UE of claim 8,
wherein the primary SIM is configured for voice communication,
wherein the secondary SIM is configured for data communication, wherein the emergency call is initiated using the primary SIM.

10. The UE of claim 8, wherein to select the cell on which to initiate the emergency call if the primary SIM of the UE is not registered with a serving cell, the radio and the processing element are further configured to:
   determine a public land mobile network (PLMN) of the secondary SIM; and
   determine if the PLMN of the secondary SIM is a preferred PLMN of the primary SIM.

11. The UE of claim 8, wherein to select the cell on which to initiate the emergency call if the primary SIM of the UE is not registered with a serving cell, the radio and the processing element are further configured to:
   determine if neighboring cell information for the secondary SIM is available; and
   search for one or more neighboring cells based on the neighboring cell information for the secondary SIM if neighboring cell information for the secondary SIM is available.

12. A non-transitory computer accessible memory medium comprising program instructions which, when executed at a wireless user equipment (UE) device, cause the UE to:
   receive an indication to initiate an emergency call;
   determine whether a serving cell of a primary subscriber identity module (SIM) is usable to initiate the emergency call;
   determine whether a serving cell of a secondary SIM of the UE is usable to initiate the emergency call if a serving cell of the primary SIM is not usable to initiate the emergency call, wherein determining whether the serving cell of the secondary SIM is usable comprises determining whether a signal strength of the serving cell of the secondary SIM meets a signal strength threshold; and
   initiate the emergency call via the serving cell of the secondary SIM if the serving cell of the secondary SIM is usable to initiate the emergency call.

13. The memory medium of claim 12,
   wherein the emergency call is initiated using the primary SIM.

14. The memory medium of claim 12, wherein when executed, the program instructions further cause the UE to:
   initiate the emergency call via the serving cell of the primary SIM if the serving cell of the primary SIM is usable to initiate the emergency call.

15. The memory medium of claim 12, wherein when executed, the program instructions further cause the UE to:
   determine whether neighboring cell information is available from one or more of the primary SIM or the secondary SIM of the UE if a serving cell of the secondary SIM is also not usable to initiate the emergency call;
   search, if the neighboring cell information is available, for one or more neighboring cells using the neighboring cell information; and
   initiate, if a cell is found based on searching for the one or more neighboring cells, the emergency call via the cell found based on searching for the one or more neighboring cells.

16. The memory medium of claim 15, wherein when executed, the program instructions further cause the UE to:
   perform, if a cell is not found based on searching for the one or more neighboring cells, a location based cell search; and
   initiate, if a cell is found based on the location based cell search, the emergency call via the cell found based on the location based cell search.

17. The memory medium of claim 12,
   wherein determining whether a serving cell of the secondary SIM is usable comprises determining whether a public land mobile network (PLMN) of a serving cell of the secondary SIM is a preferred PLMN of the primary SIM.

\* \* \* \* \*